United States Patent [19]
Perkins

[11] 4,203,312
[45] May 20, 1980

[54] CORRUGATED TUBING WITH VARIABLE DEPTH CORRUGATIONS AND METHOD OF MAKING THE SAME

[75] Inventor: Robert W. Perkins, Hamden, Conn.

[73] Assignee: Spiral Tubing Corporation, New Britain, Conn.

[21] Appl. No.: 948,256

[22] Filed: Oct. 3, 1978

Related U.S. Application Data

[62] Division of Ser. No. 837,718, Sep. 29, 1977.

[51] Int. Cl.² ............................................. B21D 15/00
[52] U.S. Cl. ........................................ 72/299; 72/371
[58] Field of Search ................ 72/299, 371, 385, 370, 72/96, 193, 208, 224; 29/157.3 AH, DIG. 41; 113/120 W, 116 B, 118 V, 118 A

[56] References Cited

U.S. PATENT DOCUMENTS

| | | | |
|---|---|---|---|
| 1,982,369 | 11/1934 | Brinkman | 72/96 |
| 2,729,266 | 1/1956 | Humphrey | 72/299 |
| 3,472,418 | 10/1969 | Ullman | 72/393 |
| 3,533,267 | 10/1970 | Bunnell | 72/299 |
| 4,059,004 | 11/1977 | Perkins | 72/299 |

Primary Examiner—Michael J. Keenan
Attorney, Agent, or Firm—McCormick, Paulding & Huber

[57] ABSTRACT

Helically corrugated tubing with corrugations of variable depth is manufactured in a twisting machine by rotating one end of a deformable tube relative to the opposite end and simultaneously applying axially directed forces to the tube to progressively develop the helical corrugations in the tube wall. The depth of the corrugations is varied by means of a tapered mandrel which is located within the tube while the corrugations are being formed. Tubing sections with variable depth corrugations define flow paths in which the effective cross sectional area varies correspondingly, and such sections are useful in various heat exchangers.

7 Claims, 6 Drawing Figures

CORRUGATED TUBING WITH VARIABLE DEPTH CORRUGATIONS AND METHOD OF MAKING THE SAME

This is a division of application Ser. No. 837,718 filed Sept. 29, 1977.

BACKGROUND OF THE INVENTION

The present invention relates to helically corrugated tubing having corrugations of variable depth and the method of manufacturing such tubing.

The manufacture of helically corrugated tubing is old in the art as indicated by U.S. Pat. Nos. 3,015,355 and 3,553,267. In general, a plain-walled tube having a cylindrical or other cross section is locally stressed at a plurality of points in a common plane to weaken the tube and start the formation of corrugations. The tube is installed in a twisting machine such as a lathe with one end of the tube engaged by a rotatable chuck in the headstock and the opposite end restrained against rotation by a non-rotatable chuck in the tailstock. A mandrel is located coaxially within the tube and the rotatable chuck is then turned to twist the one end of the tube relative to the other while at the same time axially directed forces are applied to the tube by pushing the tailstock toward the headstock. Deformation of the tube wall progresses along a spiral or helical path to form the corrugations and the depth of such corrugations is limited by the mandrel within the tube. As indicated in U.S. Pat. No. 3,533,267, the rate of rotation of the tube relative to the rate of axial movement of the tailstock toward the headstock controls the shape and pitch of the corrugations.

The corrugations in tubes facilitate their use in many different areas particularly in the heat exchange field where one fluid passes within the tube in heat exchange relationship with another fluid on the outside of the tube. The corrugations in the tube wall increase the surface area of the tube per unit of tube length and also create turbulent flow inside and outside of the tube to improve heat transfer coefficients at the inner and outer tube surfaces.

Tubing units incorporating helically corrugated tubing can be formed by composites of both plain-walled and corrugated tubing as indicated in U.S. Pat. No. 3,730,229. In addition, shell-and-tube heat exchangers incorporate spiral tubing in tube bundles in order to gain the benefit of improved heat transfer coefficients in the bundle design.

In the prior art heat exhangers, the corrugations in the tubing are generally uniform from one end of the tube to the other and, correspondingly, the pitch and shape of the corrugations remain substantially the same from one end of the tube to the other. While such corrugations improve the heat transfer coefficients by virtue of the larger surface areas and induced turbulence, the cross sectional area of the tube remains unchanged as in a conventional tube and any changes in state or density of the fluid mediums are not accommodated. Increased pressure levels or velocities and backpressure are experienced.

It is a general object of the invention to disclose a new and novel tubing having a tube wall formed with helical corrugations that vary in depth along the length of the tubing and effectively change the cross sectional flow area through or over the tubing. It is also an object of the present invention to disclose a method for making the novel tubing. It is a further object of the invention to provide a heat exchanger utilizing the novel tubing.

SUMMARY OF THE INVENTION

The present invention resides principally in a metal tube having helical corrugations along at least one portion of the tube. The depth of the corrugations varies gradually from one end to the other which in effect changes the cross sectional flow area both internally and externally of the tube.

The invention also entails the method of making the corrugated tube with variations in the corrugation depth. A tube having a deformable wall disposed about the tube axis is stressed at a plurality of locations in a plane transverse to the tube axis. An elongated mandrel tapered along one portion of its length is positioned within the tube with the tapered portion located inside at least one section of the tube. The taper changes the cross sectional area of the mandrel gradually and in a linear or non-linear manner.

With the mandrel inside of the tube, the tube is twisted while axially directed forces are simultaneously applied to the tube to cause the tube wall to deform along a helical path and progressively develop corrugations from the stressed locations. The mandrel within the tube limits the depth of the corrugations so that the corrugations formed in the section of the tube over the tapered portion of the mandrel have a variable depth. Due to the variations, the effective cross sectional area of the tube changes.

The variation in cross sectional area of the tubing can be used advantageously in heat exchangers, particularly those in which there is an expansion, contraction or change in state of the fluid mediums that pass through the exchanger. The fluid mediums may flow within the tube or over the outside of the tube, and in each case the change in cross sectional area may accommodate a change in the character of the mediums.

DESCRIPTION OF THE PREFERRED EMBODIMENTS

Figure 1:
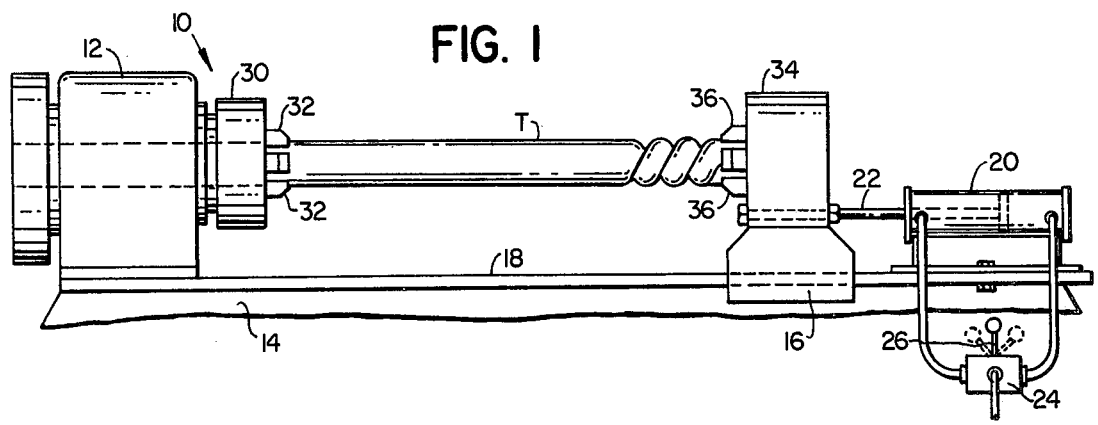
FIG. 1 is a side elevation view of a twisting machine for forming helically corrugated tubes in accordance with the present invention.

FIG. 1 illustrates a twisting machine which is utilized to form helical corrugations in the wall of a deformable metal tube T in accordance with the present invention. The machine, generally designated 10, may be a lathe which includes a headstock 12 positioned in stationary relationship at one end of a bed 14 and a tailstock 16 mounted slidably on ways 18 for displacement axially of the lathe toward and away from the headstock 12. A hydraulic or pneumatic actuating cylinder 20 is fixedly secured to the bed 14 at one end of the ways 18. The cylinder includes an actuating rod 22 that connects to the tailstock 16 and forces the tailstock to move toward and away from the headstock when the cylinder is actuated. Power for the cylinder is derived from a hydraulic or pneumatic source and is applied to the cylinder through a control valve 24. The valve illustrated is controlled manually by the means of a handle 26 but a motor-controlled valve in an automatic control system for the machine can be employed instead.

In the corrugation forming process, the tube T made of copper, aluminum or alloys of these and other metals is installed in the machine 10. One end of the tube is grasped by the jaws 32 of a rotatable chuck 30 while the opposite end of the tube is grasped by the jaws 36 of a non-rotatable chuck 34 on the tailstock 16. Thus, the jaws 32 twist the one end of the tube relative to the opposite end which is restrained against rotation by the jaws 36.

Figure 2:
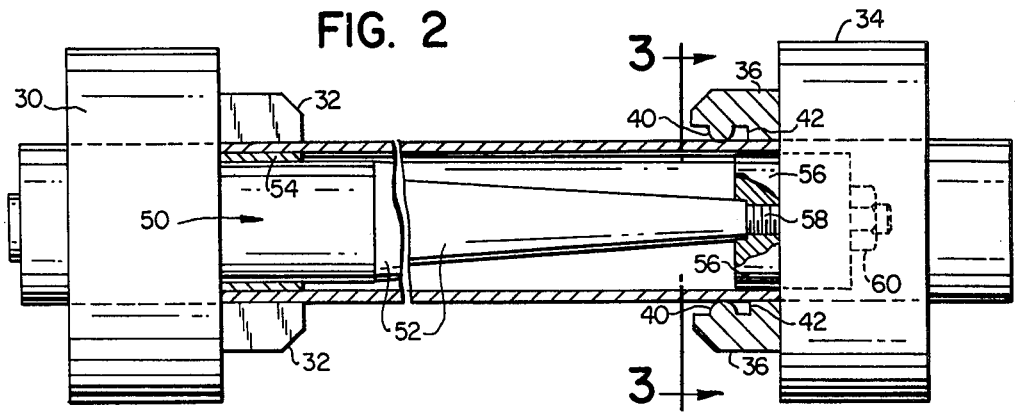
FIG. 2 is an enlarged fragmentary sectional view of the corrugated tube in the twisting machine at the beginning of a corrugating operation.
Figure 3:
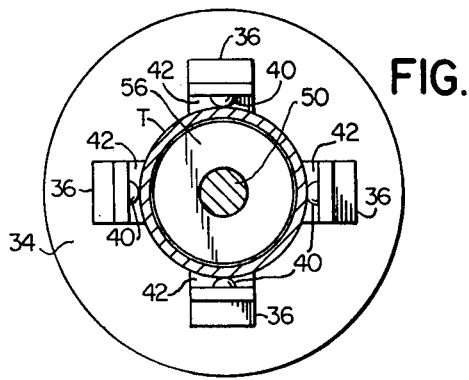
FIG. 3 is a sectional view of the twisting machine as seen along the sectioning line 3—3 in FIG. 2.

To initiate or start deformation of the tube T in the forming process, the tube wall is stressed at a plurality of locations in a plane generally transverse to the tube axis. Such stressing can be performed before the tube is installed in the machine by means of dimpling or pimpling devices such as shown in U.S. Pat. No. 3,533,267 or, as illustrated, each of the jaws 36 of the non-rotating chuck 34 may be provided with pimples 40 adjacent the clamping shoe 42 as shown in FIGS. 2 and 3. When the jaws 36 close upon the tube T the shoes 42 firmly grip the tube while the pimples 40 develop local stresses in the tube wall which may or may not plastically deform the wall. Further description of the pimples 40 and the stressing operation can be found in U.S. Pat. No. 4,059,004 having the same assignee as the present invention.

In order to form the corrugations in a section of the tubing in accordance with the present invention, an elongated mandrel 50 having a tapered portion 52 is installed coaxially in the tube by means of a bushing 54 within the jaws 32 and an anchor plug 56 within the shoes 42 of the jaws 36. The bushing 54 permits the adjacent end of the mandrel 50 to rotate and axially translate relative to the tube during a twisting operation and holds the mandrel coaxially within the tube. However, the bushing is not necessary in all instances and may be eliminated if desired since the corrugations formed in the tube wall tend to center the mandrel during the forming process.

The anchor plug 56 fits snuggly against the inside surface of the tube wall and is held in position when the jaws 36 are closed on the outside of the tube. A recessed hole at the center of the plug receives a threaded stud 58 on the tapered end of the mandrel 50. The stud extends through the anchor plug and a retaining nut 60 threadably engages the study on the side of the plug opposite the mandrel. The plug 56 and the nut 60 hold the mandrel at a fixed axial position relative to the non-rotating chuck 34 during the corrugation forming process, and thus, the end of the mandrel adjacent the tapered portion 52 is restrained against axial movement relative to the portion of the tube clamped by the jaws 36.

Figure 4:
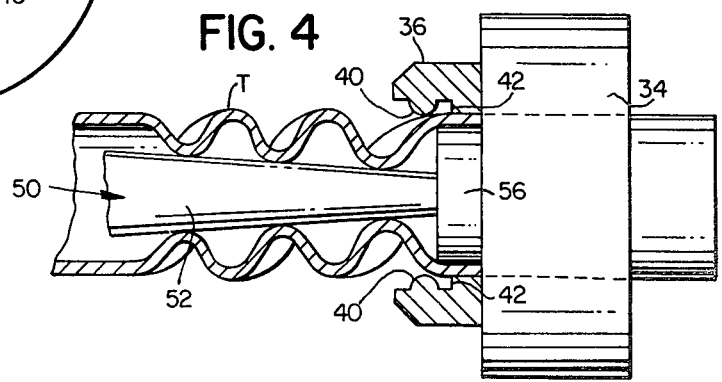
FIG. 4 is a fragmentary cross sectional view of the corrugated tube in the twisting machine after the corrugations have developed along a portion of the tapered mandrel during a corrugating operation.

With the pimples 40 pressing radially inward against the tube wall and the mandrel installed as shown in FIG. 2, the chuck 30 of the machine 10 is rotated and the tailstock 16 is simultaneously pushed and displaced toward the headstock 12 by means of the actuating cylinder 20. The rotation of the chuck 30 and the displacement of the non-rotatable chuck 34 with the tailstock applies twisting and axial compressive forces to the tube wall and causes the tube wall to deform along spiral paths and progressively develop the helical corrugations from areas stressed by the pimples 40. The anchor plug 56 fitting snugly within the tube prevents deformations in the area occupied by the plug. Thus, the helical corrugations develop from the tailstock 16 toward the headstock 12 as illustrated in FIGS. 1 and 4.

The inward deformation of the tube wall is limited by the mandrel 50 as taught in U.S. Pat. No. 3,533,267; however, the mandrel here is gradually tapered along the portion 52 so that the inward deformation of the wall and the depth of the corrugations or intervening flutes varies correspondingly in the section of tube overlying the taper. The tube T illustrated has a cylindrical tube wall of circular cross section, and the tapered portion 52 of the mandrel 50 has a frustoconical shape. The tapered portion 52 therefore also has a circular cross section and a linear variation in thickness along its length. It should be understood that the tube wall can have other cross sections, such as a hexagon or octagon, and the mandrel 50 may taper linearly or non-linearly depending upon the particular variation desired in the depth of the corrugations.

After the helical or spiral corrugations have been formed to any desired length in the tube wall, rotation of the chuck 30 and displacement of the non-rotatable chuck is stopped. The retaining nut 60 is removed from the one end of the mandrel 50 and the mandrel, if it serves no further purpose, is withdrawn from within the corrugated tube. The mandrel can be withdrawn through the hollow spindle of the headstock 12 before the tube T is removed from the machine, or the mandrel can remain in the tube until after the tube has been removed from the machine. The anchor plug 56 is also removed when the clamping force of the jaws 36 is relaxed.

Figure 5:
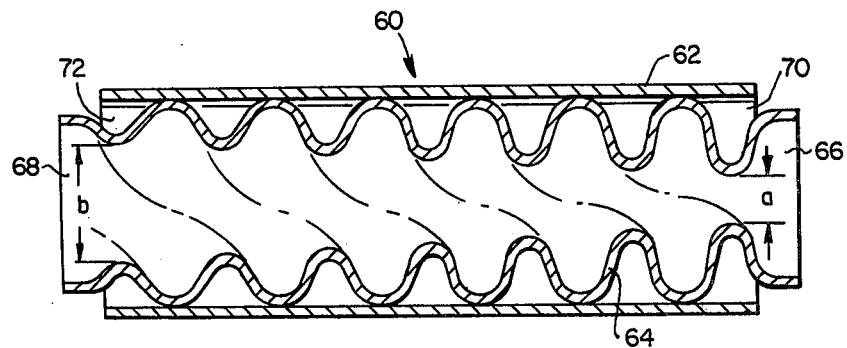
FIG. 5 is a cross sectional view of a tube-in-tube heat exchanger employing tubing having helical corrugations of variable depth.

FIG. 5 illustrates a tube-in-tube heat exchanger 60 comprised of two coaxial tubes 62 and 64. The tube 62 is a plain-walled tube having a circular cross section; however, the tube 64 has helical corrugations of variable depth imposed on a circular wall in accordance with the present invention. The peaks of the corrugations on the tube 64 fit tightly in sealing relationship against the inside surface of the tube 62 which holds the tubes coaxially aligned. The method of forming tube-in-tube exchangers is disclosed in detail in U.S. Pat. No. 3,777,343 having the same assignee as the present invention.

With the tubes coaxially mounted as illustrated, two separate fluid conduits are formed within the exchanger 60. One of the conduits is defined within the corrugated tube 64 and the other of the conduits is defined between the tube 62 and the tube 64.

The conduit defined within the helically corrugated tube 64 has an entrance or inlet 66 at one end and an exit 68 at the opposite end. Between the entrance and exit the depth of the corrugations decreases and, correspondingly, the bore of the tube increases gradually from the dimension a to the dimension b. The cross sectional area of the tube increases approximately by the square of these dimensions $a^2$, $b^2$. A fluid medium such as a gas receiving heat as it passed between the entrance and exit naturally expands. Since the cross sectional flow area is larger at the exit than at the entrance, the normal increase in pressure, density of velocity of the gas that would be experienced in a heat exchanger of constant cross section is not observed, and can be accommodated without otherwise affecting the operation of the exchanger 60.

Since the cross sectional area of the tube 62 alone is constant at each point along its length and the cross sectional area of the inner tube 64 increases from the inlet 66 to the exit 68, a complementary decrease in the cross sectional area between the tubes 62 and 64 occurs from the annular opening 70 at one end of the exchanger to the annular opening 72 at the opposite end. Therefore, the fluid medium flowing between the annular openings 70 and 72 experiences a decrease in the cross sectional flow area of the conduit formed between the two tubes, and in the case of a gas, such a change in cross section accommodates the natural contraction of a gas if it gives up heat to the medium within the corrugated tube 64. When the direction of gas flow and the direction of heat transfer are reversed within the exchanger, the variable geometry of the conduits formed by the tubes is also consistant with the expansion and contraction of the gases. Thus, the natural contraction and expansion of gaseous mediums can be accommodated by the change in the flow areas through the conduits.

Figure 6:
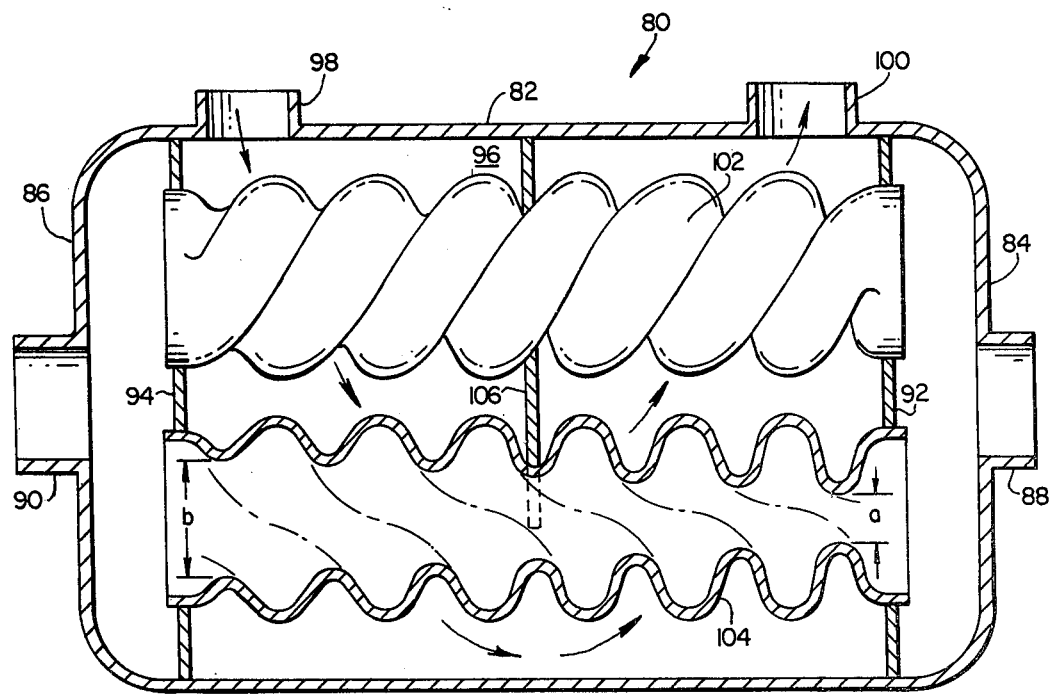
FIG. 6 is a cross sectional view of a shell-and-tube heat exchanger utilizing tubing having helical corrugations of variable depth.

A shell-and-tube heat exchanger employing the corrugated tubing of the present invention is illustrated in FIG. 6. The exchanger 80 has an external shell 82 with two end manifolds 84 and 86 including an inlet 88 and an exit 90 respectively. A heat exchange chamber 96 is defined within the shell 82 between end walls 92 and 94, and a tubular inlet 98 and exit 100 are provided to duct heat exchange fluid through the chamber. A baffle plate 106 guides the fluid through the chamber as indicated by the arrows.

Supported between the end walls 92 and 94 of the chamber 96 is a tube bundle comprised of helically corrugated parallel tubes 102 and 104. The corrugations of the tubes have a depth that varies from one end to the other as indicated by the bore diameters a, b in tube 104. Both tubes are mounted with the deeper corrugations adjacent the end wall 92 and the more shallow corrugations connected with the end wall 94. Thus, the depth of the corrugations of both tubes decreases from the wall 92 to the wall 94, and the cross sectional flow areas within the tubes increase correspondingly.

When one heat exchange medium such as a gas passed from the inlet 88 through the bundle of tubes 102 and 104 to the exit 90, the effective cross sectional area of the flow path through the tubes increases and accommodates any natural expansion of the medium due to the heat delivered from a second medium passing through the shell 82 between the inlet 98 and the exit 100. Although a slight decrease in cross section of the chamber 96 occurs from the end wall 94 to the end wall 92, such change is not particularly noticeable especially if the jacket 82 has a shape such as a cylinder which renders the chamber 96 substantially larger than the volume occupied by the tubes 102 and 104.

While the present invention has been described in several preferred embodiments, it should be understood that numerous modifications and substitutions can be made without departing from the spirit of the invention. For example, the corrugations along the length of the tube vary in accordance with the tapered portion of the mandrel and can also be extended onto the non-tapered portion of the mandrel so that one section of the tube can have corrugations of varying depth while another section of the tube has corrugations of relatively fixed depth. The mandrel 50 is restrained axially relative to the jaws 36 by means of the anchor plug 56; however, the mandrel may be restrained by other means outside of the tube T. The heat exchangers described and illustrated in FIGS. 5 and 6 merely represent two specific exchangers and flow patterns. The tubing can be used in many other heat exchange designs including condensers and evaporators where a fluid medium changes between a gaseous and liquid phase. Accordingly, the present invention has been described in a preferred embodiment by way of illustration rather than limitation.

I claim:

1. A method of forming helical corrugations of varying depth in a tube comprising the steps of:
    providing a tube having a deformable tube wall disposed about a tube axis;
    stressing the tube wall at a plurality of locations in a plane transverse to the tube axis;
    positioning an elongated mandrel tapered along one portion of its length within the tube with the tapered portion located inside at least one section of the tube; and
    simultaneously twisting and applying axially directed forces to the tube while the tapered portion of the mandrel is axially held in position in said one section of the tube to cause the tube wall to deform and progressively develop helical corrugations in final form at the stressed locations of the tube wall and then along the tube in the tube section overlying the tapered portion of the mandrel whereby the tapered portion of the mandrel makes contact with and limits the inward deformation of the tube wall in said one section of the tube only after the final depth of the corrugations is reached, and varies the final depth of the corrugations along said one section of the tube.

2. A method of forming helical corrugations of varying depth in a tube as defined in claim 1 wherein:
    the step of providing comprises providing a tube having a circular cross section; and
    the step of positioning comprises positioning a mandrel having a circular cross section at each axial station along the tapered portion within the tube.

3. A method of forming helical corrugations of varying depth in a tube as defined in claim 1 wherein the step of positioning comprises positioning the tapered portion of the mandrel coaxially within the one section of the tube.

4. The process of manufacturing helically corrugated tubing with flutes of constantly varying depth comprising:
    mounting a section of deformable tubing in a twisting machine having a rotatable chuck gripping the section at one end and a coaxial non-rotatable chuck gripping the section at the opposite end;
    positioning a gradually tapered mandrel within the section of tubing with the mandrel restrained at one end against axial movement relative to the tubing;
    turning the rotatable chuck of the machine relative to the non-rotatable chuck to twist the one end of the tube section relative to the other end and simultaneously moving the one chuck axially relative to the other to deform the tube and progressively develop helical corrugations along the tube; and
    allowing the flutes of the corrugations to deform inwardly from the original position of the tube wall spaced outwardly from the restrained, tapered mandrel toward and finally against the tapered mandrel as the corrugations develop whereby the finally formed flutes vary in depth in accordance with the taper on the mandrel.

5. The process of manufacturing helically corrugated tubing with flutes of varying depth as defined in claim 4 wherein the step of mounting comprises mounting a cylindrical tube of circular cross section in the twisting machine.

6. The process of manufacturing helically corrugated tubing as defined in claim 5 wherein the step of positioning comprises positioning a mandrel having a frusto-conical tapered portion coaxially within the cylindrical tube.

7. The process of manufacturing helically corrugated tubing as defined in claim 4 wherein the step of positioning comprises positioning the mandrel within the section of tubing with one axial end of the tapered mandrel opposite the restrained end free to move relative to the adjacent portion of the tubing.

* * * * *